US010266098B1

(12) United States Patent
Cox et al.

(10) Patent No.: US 10,266,098 B1
(45) Date of Patent: Apr. 23, 2019

(54) CARGO TRANSPORTATION SYSTEM INCLUDING A SANDWICH PANEL AND A CHANNEL

(71) Applicant: CELLTECH METALS, INC., Oceanside, CA (US)

(72) Inventors: Douglas P Cox, San Diego, CA (US); Fabien Ebnöther, Munich (DE)

(73) Assignee: Celltech Metals, Inc., Searcy, AR (US)

( * ) Notice: Subject to any disclaimer, the term of this patent is extended or adjusted under 35 U.S.C. 154(b) by 0 days.

(21) Appl. No.: 15/850,045

(22) Filed: Dec. 21, 2017

(51) Int. Cl.
| | |
|---|---|
| *B60P 7/08* | (2006.01) |
| *B62D 33/04* | (2006.01) |
| *B62D 65/02* | (2006.01) |
| *B21C 23/00* | (2006.01) |
| *B32B 15/01* | (2006.01) |
| *B32B 37/12* | (2006.01) |
| *B21B 1/22* | (2006.01) |
| *B32B 7/12* | (2006.01) |

(52) U.S. Cl.
CPC .............. *B60P 7/0815* (2013.01); *B21B 1/22* (2013.01); *B21C 23/00* (2013.01); *B32B 7/12* (2013.01); *B32B 15/01* (2013.01); *B32B 37/12* (2013.01); *B62D 33/046* (2013.01); *B62D 65/02* (2013.01)

(58) Field of Classification Search
CPC .... B60P 7/0815; B62D 33/046; B62D 29/045
USPC ...................................................... 296/186.1
See application file for complete search history.

(56) References Cited

U.S. PATENT DOCUMENTS

| | | |
|---|---|---|
| 782,558 A | 2/1905 | Hahn |
| 2,087,010 A | 7/1937 | Wardle |
| 2,391,997 A | 1/1946 | Noble |
| 2,441,476 A | 5/1948 | Ewald |
| 2,481,046 A | 9/1949 | Scurlock |
| 2,605,064 A | 7/1952 | Davis |
| 2,738,297 A | 3/1956 | Pfisterhammer |
| 2,809,908 A | 10/1957 | French |
| 2,950,788 A | 8/1960 | Edgar |
| 3,013,641 A | 12/1961 | Compton |
| 3,071,853 A | 1/1963 | Price et al. |

(Continued)

FOREIGN PATENT DOCUMENTS

| | | |
|---|---|---|
| GB | 2182703 A | 5/1987 |
| WO | WO-2015/148707 A1 | 10/2015 |

OTHER PUBLICATIONS

Kim, Jang-Kyo, et al.; "Forming and failure behaviour of coated, laminated and sandwiched sheet metals: a review", *Journal of Materials Processing Technology*, 63, 1997, pp. 33-42.

(Continued)

*Primary Examiner* — Jason S Morrow
(74) *Attorney, Agent, or Firm* — Harness, Dickey & Pierce, PLC (57) ABSTRACT

A cargo transportation system includes a sandwich panel and a channel. In another aspect, a cargo-securing or logistics track, or tie-down slat, is attached to a continuously slotted channel which is secured within a sandwich panel of a cargo container, which employs at least one core sheet including alternating peaks and valleys therein in addition to attached interior and exterior face sheets. Yet another aspect of a cargo transportation system includes an interior face sheet flange of a sandwich panel overlapping a flush mounted lateral segment of a slotted channel.

43 Claims, 10 Drawing Sheets

(56) References Cited

U.S. PATENT DOCUMENTS

| | | | |
|---|---|---|---|
| 3,086,899 A | 4/1963 | Smith | |
| 3,151,712 A | 10/1964 | Jackson | |
| 3,173,383 A | 3/1965 | Eggert | |
| 3,217,845 A | 11/1965 | Reynolds | |
| 3,227,598 A | 1/1966 | Robb | |
| 3,432,859 A | 3/1969 | Jordan | |
| 3,481,642 A | 12/1969 | Campbell | |
| 3,525,663 A | 8/1970 | Hale | |
| 3,597,891 A | 8/1971 | Martin | |
| 3,742,663 A | 7/1973 | Duskin | |
| 3,757,559 A | 9/1973 | Welsh | |
| 3,834,487 A | 9/1974 | Hale | |
| 3,865,679 A | 2/1975 | Hale | |
| 3,876,492 A | 4/1975 | Schott | |
| 3,914,486 A | 10/1975 | Borgford | |
| 3,938,963 A | 2/1976 | Hale | |
| 3,950,259 A | 4/1976 | Pallo et al. | |
| 4,025,996 A | 5/1977 | Saveker | |
| 4,044,186 A | 8/1977 | Stangeland | |
| 4,049,855 A | 9/1977 | Cogan | |
| 4,077,247 A | 3/1978 | Stewart | |
| 4,275,663 A | 6/1981 | Sivachenko et al. | |
| 4,344,995 A | 8/1982 | Hammer | |
| 4,356,678 A | 11/1982 | Andrews et al. | |
| 4,411,121 A | 10/1983 | Blacklin et al. | |
| 4,635,992 A | 1/1987 | Hamilton et al. | |
| 4,718,214 A | 1/1988 | Waggoner | |
| 4,910,065 A | 3/1990 | McKinney | |
| 5,030,488 A | 7/1991 | Sobolev | |
| 5,195,580 A | 3/1993 | Hoeffken | |
| 5,366,787 A | 11/1994 | Yasui et al. | |
| 5,580,637 A | 12/1996 | Konta et al. | |
| 5,678,715 A | 10/1997 | Sjostedt et al. | |
| 5,791,118 A | 8/1998 | Jordan | |
| 5,860,693 A * | 1/1999 | Ehrlich | B62D 29/045 296/186.1 |
| 6,183,879 B1 | 2/2001 | Deeley | |
| 6,220,651 B1 * | 4/2001 | Ehrlich | B62D 29/045 296/186.1 |
| 6,257,043 B1 | 7/2001 | Wiens | |
| 6,412,854 B2 | 7/2002 | Ehrlich | |
| 6,547,280 B1 | 4/2003 | Ashmead | |
| 6,846,559 B2 | 1/2005 | Czaplicki et al. | |
| 6,908,143 B2 | 6/2005 | Ashmead | |
| 6,928,848 B2 | 8/2005 | Golovashchenko et al. | |
| 6,939,599 B2 | 9/2005 | Clark | |
| 6,959,959 B1 * | 11/2005 | Roush | B62D 33/046 296/186.1 |
| 7,010,897 B1 | 3/2006 | Kuppers | |
| 7,025,408 B2 | 4/2006 | Jones et al. | |
| 7,100,971 B2 | 9/2006 | Pines | |
| 7,214,018 B2 | 5/2007 | Lussier | |
| 7,267,393 B2 | 9/2007 | Booher | |
| 7,401,844 B2 | 7/2008 | Lemmons | |
| 7,527,325 B2 | 5/2009 | Yurgevich | |
| 7,621,589 B1 | 11/2009 | Gerome | |
| 7,648,058 B2 | 1/2010 | Straza | |
| 7,752,729 B2 | 7/2010 | Faehrrolfes et al. | |
| 7,753,254 B2 | 7/2010 | Straza | |
| 7,757,931 B2 | 7/2010 | Straza | |
| 7,798,447 B2 | 9/2010 | Frantz et al. | |
| 7,927,708 B2 | 4/2011 | Mizrahi | |
| 7,931,328 B2 | 4/2011 | Lewallen et al. | |
| 8,016,152 B2 | 9/2011 | Roush et al. | |
| 8,205,642 B2 | 6/2012 | Straza | |
| 8,419,110 B2 | 4/2013 | Katz et al. | |
| 8,426,010 B2 | 4/2013 | Stadthagen-Gonzalez | |
| 8,434,472 B2 | 5/2013 | Hanson et al. | |
| 8,506,221 B2 | 8/2013 | Pattison et al. | |
| 8,540,099 B2 * | 9/2013 | Roush | B65D 90/022 220/1.5 |
| 8,580,061 B2 | 11/2013 | Cik | |
| 9,067,729 B2 | 6/2015 | Fenton | |
| 9,764,780 B2 | 9/2017 | Zehner et al. | |
| 9,884,660 B2 | 2/2018 | Fenton | |
| 9,884,661 B2 | 2/2018 | Fenton | |
| 2003/0080586 A1 * | 5/2003 | Ehrlich | B60P 7/15 296/191 |
| 2003/0210966 A1 | 11/2003 | Haire | |
| 2005/0029708 A1 | 2/2005 | Coyle | |
| 2005/0084703 A1 | 4/2005 | Ashmead | |
| 2009/0159592 A1 | 6/2009 | Vitalis et al. | |
| 2012/0234470 A1 | 9/2012 | Nishio et al. | |
| 2013/0224419 A1 | 8/2013 | Lee et al. | |
| 2015/0078804 A1 * | 3/2015 | Ehrlich | B60P 7/0807 403/10 |
| 2015/0165724 A1 | 6/2015 | Cox et al. | |

OTHER PUBLICATIONS

Van Straalen, Ijsbrand J.; "Comprehensive Overview of Theories for Sandwich Panels", TNO Building and Construction Research, 1998, pp. 48-70.

Stoffer, Harry; "Some suppliers see dollars in a higher CAFE", Automotive News, Crain Communications, Inc., Jul. 2, 2007, two pages.

Carey, John; "What's Next—Green Biz Materials of New Plastics and a Steel Sandwich", BusinessWeek, Oct. 22, 2007, one page.

". . .Honeycomb Structure Holds Potential", Autotech Daily, Apr. 15, 2008, one page.

Vasilash, Gary S.; "From Small Things: Big Differences", Automotive Design and Production, Jun. 2008, one page.

"UltraSteel" brochure published by Hadley Group in Oct. 2010, 8 pages.

Ebnoether, Fabien, et al.; "Predicting ductile fracture of low carbon steel sheets: Stress-based versus mixed stress/strain-based Mohr-Coulomb model;" International Journal of Solids and Structures 50 (2013; published online Dec. 27, 2012); pp. 1055-1066.

Photos of Hyundai "EcoCell" trailer, containing doors including CellTech LLC's three sheet steel sandwich, shown at U.S. tradeshow in Mar. 2013.

"Whiting AirCell Availabity," Whiting airCell promotion, Sep. 26, 2013, three pages.

"AirCELL—Innovative Panels for the Truck & Trailer Industries", Whiting, published before Dec. 4, 2013, one page.

"Meyer—Laminating machines for technical textiles, foams, non-woven, foils, fabrics," http.//www.meyer-machines.com/engl/Products/Laminating/laminating.html, printed from internet, believed to have been published prior to Dec. 13, 2013, one page.

"AirCELL The revolutionary all-steel sandwich panel that increases strength and reduces weight for trailer side walls and doors" Whiting, published prior to Nov. 2013, four pages.

* cited by examiner

CARGO TRANSPORTATION SYSTEM INCLUDING A SANDWICH PANEL AND A CHANNEL

BACKGROUND

The present application relates generally to cargo systems and more particularly to a cargo transportation system including a sandwich panel and a channel.

It has long been desired in the box trailer industry to have walls and floors made of lightweight and strong panels which are strongly joined together. Most conventional trailer walls and floors, however, require a foam filling, which is heavy and prevents recycling, thereby increasing trailer weight which wastes fuel and/or lessens cargo carrying capacity. Furthermore, traditional tracks, posts and joints are heavy, complicated and labor intensive to install. Many also protrude within the cargo space and are prone to snagging by cargo when inserted in the trailer. Exemplary conventional attempts at such a construction are disclosed in the following U.S. patents and patent publication: U.S. Pat. No. 7,100,971 entitled "Cargo Body with Recessed Posts" which issued to Pines on Sep. 5, 2006; U.S. Pat. No. 8,016,152 entitled "Container Sidewall Connector" which issued to Roush et al. on Sep. 13, 2011; and 2013/0224419 entitled "Composite Panel and Joint Construction" which published to Lee et al. on Aug. 29, 2013. All of these are incorporated by reference herein.

It is noteworthy, however, that these conventional approaches still suffer the same snagging concerns and the panel-to-panel attachments are expensive to manufacture. Furthermore, most traditional devices require additional add-on attachment brackets which span between the adjacent panels; but these configurations typically require juggling of many loose parts, such as rivets, while attempting to align and hold the panels in position, along with undesired extra part handling and weight. The localized attachment points also undesirably concentrate the forces during use thereby creating premature panel fractures at the localized points. Moreover, prior panel-to-panel seams and rivet holes sometimes allow water entry such as in rainy weather which can harm the cargo transported in the container.

The prior riveting attachment of logistics tracks directly to side wall panels undesirably requires piercing of the panels and does not allow track locational adjustment. The end use customers or dealerships, however, often need to subsequently move the logistics tracks which requires aftermarket hole piercing for new rivets and either empty leaking, unused holes or caulking of the now unused holes, which is time consuming and unsightly.

Commonly owned U.S. Patent Publication No. 2017/0327310, entitled "Cargo Container Apparatus Including a Sandwich Structure and a Track," discloses a C-shaped track mounted within a depression of a sandwich structure. This application is incorporated by reference herein. While it is a significant improvement in the industry, there is room for additional improvements.

SUMMARY

In accordance with the present invention, a cargo transportation system includes a sandwich panel and a channel. In another aspect, a cargo-securing or logistics track, or tie-down slat, is attached to a continuously slotted channel which is secured within a sandwich panel of a cargo container, which employs at least one core sheet including alternating peaks and valleys therein in addition to attached interior and exterior face sheets. A further aspect employs a threaded fastener having an enlarged head, which is slidable within the slot which has an undercut or generally T-cross sectional shape. Yet another aspect of a cargo transportation system includes an interior face sheet flange of a sandwich panel, overlapping a flush mounted lateral segment of a slotted channel. A method of making a cargo transportation system, including a sandwich panel and a channel, is also provided.

The present cargo transportation system is advantageous over prior constructions. For example, the present cargo transportation system allows for fast and easy logistics track-to-side wall or floor panel adjustment with slidably adjustable fasteners, and without rivets or hole piercing, especially in an aftermarket situation. Thus, water leaks are avoided. Furthermore, the present system is advantageously lightweight, extremely strong and has a thin interior-to-exterior cross-section. The present apparatus provides an essentially flush mounted track thereby making it easier to load and unload cargo in the trailer or container without snags while enhancing the aesthetic appearance. Furthermore, fasteners can be slid to infinite positions along the panel-attached channel, rather than in discreet spaced apart holes, in some embodiments, thereby making container assembly easier and stronger while allowing the sandwich and channel system to be manufactured and pre-assembled in an initial manufacturing site different than a final container assembly site and well before the container, trailer or vehicle is shipped to a dealer or end-use customer. Additional advantages and features of the present invention can be ascertained from the following description and appended claims, as well as in the accompanying drawings.

DETAILED DESCRIPTION

Figure 1:
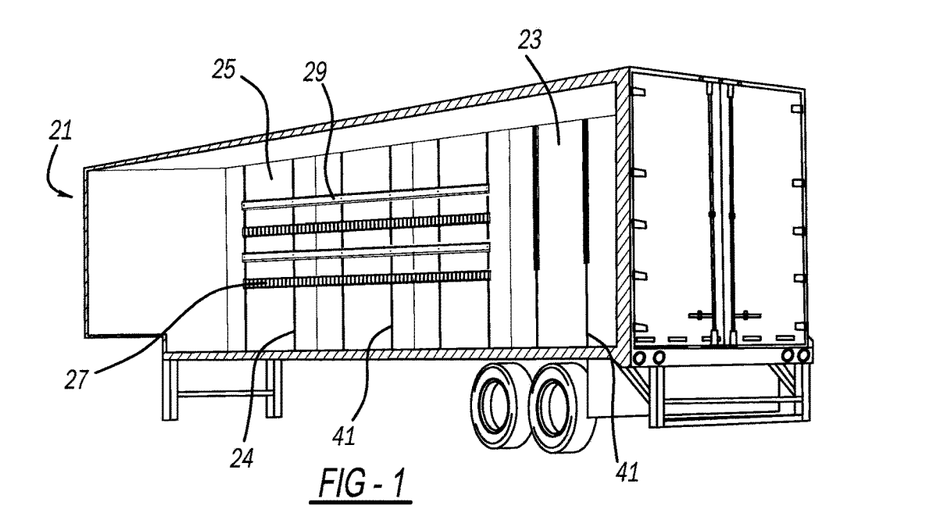
FIG. 1 is a fragmentary perspective view showing a cargo transportation system of the present invention in a trailer.
Figure 2:
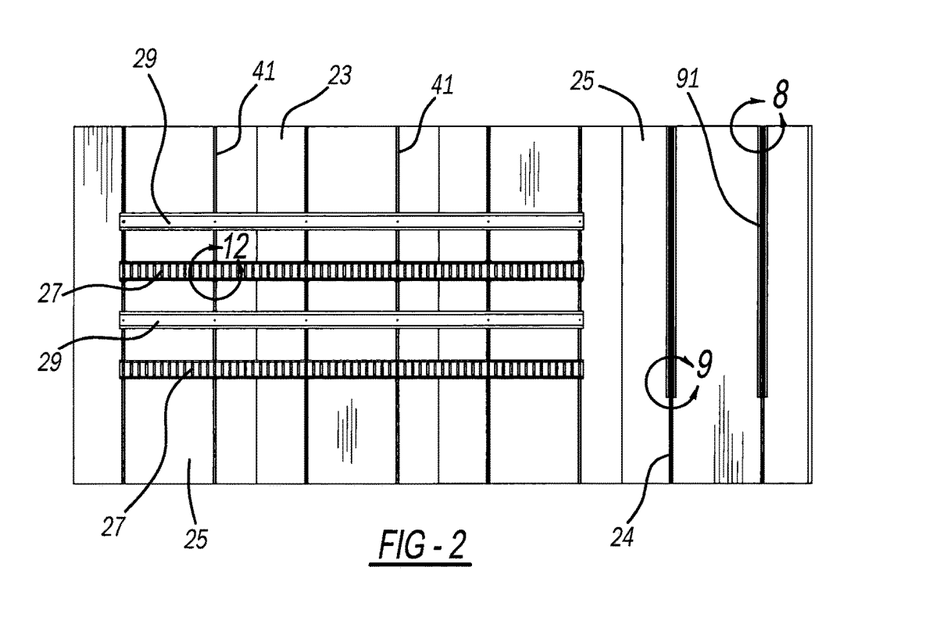
FIG. 2 is a side elevational view showing the present system.
Figure 3:
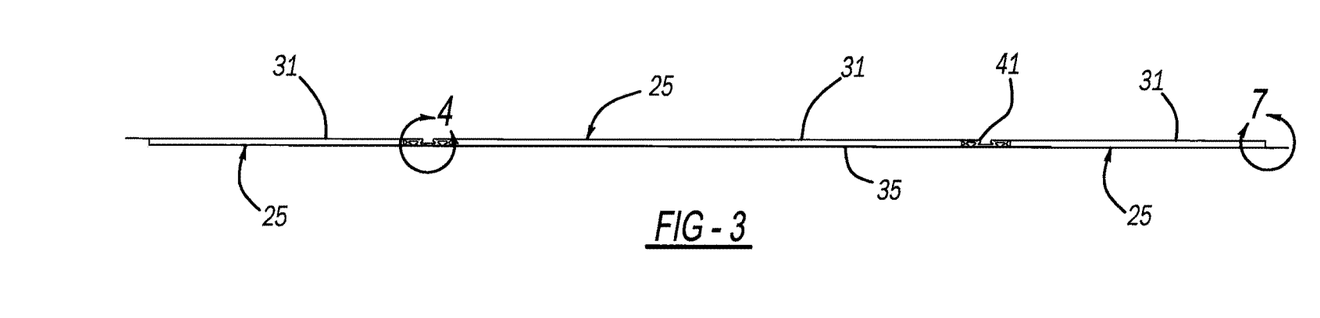
FIG. 3 is a top elevational view showing the present system.

FIGS. 1 and 2 illustrate a cargo transportation system including a cargo-carrying container 21, preferably a wheeled box trailer pulled by an automotive tractor or truck, which includes multiple sandwich panels 23 therein. Sandwich panels 23 serve as structural side wall panels 25, which include elongated channels 41 therein, to which structural cargo securing or logistics tracks 27, and/or tie-down slats or rubrails 29, are attached. Sandwich panels 23 can alternately be used as a front wall, roof or movable door. Moreover, sandwich panels 23 may define a load bearing floor structure. Unless otherwise specified hereinafter, all of the trailer container constructions disclosed herein are also suitable for defining sections of other transportation containers such as an intermodal shipping container, a railroad car, cargo holding portions of a utility van or passenger vehicle, decks of a watercraft such as a cargo carrying ship, and the like. An exemplary intermodal shipping container is disclosed in U.S. Pat. No. 5,678,715 entitled "Composite Stacking Frame Assembly for Shipping Container" which issued to Sjostedt et al. on Oct. 21, 1997, and is incorporated by reference herein.

Sandwich panels 23 can be observed in greater detail in FIGS. 6, 7, 15 and 16. Each sandwich panels 23 includes a first generally flat, interior face sheet 31, a middle core sheet 33 and an opposite generally flat, exterior face sheet 35. Furthermore, core sheet 33 includes alternating peaks 37 and valleys 39, the external surface of each being defined by a generally flat land 41. Moreover, raised ridges 43 bridge or span between adjacent peaks 37 along a first width direction W but not in the perpendicular length direction L, where a more abrupt and steeply angled depression 45 is formed. Depressed areas 45 are located between adjacent peaks 37 along second direction L although each depressed area is elongated parallel to ridges 43 since the depressed areas are created on the back side of the ridges when the core sheet is formed into the desired contours from an initially flat workpiece sheet. Each ridge 43 is slightly lower than the generally flat lands 41 of the neighboring peaks 37.

Face sheets 31 and 35 are preferably metallic, such as low carbon steel, and core sheet 33 is preferably metallic such as aluminum. But any or all of these sheets may alternately be aluminum, low carbon steel, stainless steel or other metallic materials. Alternately, the face sheets can be composite materials to allow for larger widths than are typically available in metal sheets. The metal grain structure is also different in the roll/feeding direction L of core sheet 33 than in the cross-roll/cross-feeding direction W. The core is preferably formed by embossing rollers as is disclosed in commonly owned U.S. Patent Publication No. 2017/0036415 entitled "Sandwich Structure Including Grooved Outer Sheet," U.S. Patent Publication No. 2015/0165724 entitled "Sandwich Structure," and U.S. Patent Publication No. 2015/0044494 entitled "Optional Sandwich Core Structures and Forming Tools for the Mass Production of Sandwich Structures," all of which are incorporated by reference herein.

The placement of ridges 43 and depressed areas 45 between the alternating peaks and valleys of core sheet 33 give the core sheet asymmetrical properties or characteristics after and during forming. For example, a length shrinkage factor fs, which is the initial core sheet length versus the formed end sheet length, is at least 1.08, and more preferably at least 1.10 in the roll direction L, as compared to a shrinkage factor fs of approximately 1.0 in the cross-roll/cross-feeding direction W. Furthermore, an out-of-plane shear stiffness of core sheet 33 is at least 1.3 times greater, and more preferably at least 1.4 times greater in the cross-roll/cross-feeding direction W, as compared to the roll/feeding direction L:

$$[L] - G_{WT}/G_{LT} \geq 1.3$$

Additionally, an out-of-plane shear strength of core sheet 33 is at least 1.05 times greater, and more preferably at least 1.1 times greater in the cross-roll/cross-feeding direction W, as compared to the roll/feeding direction L:

$$[L] - \tau_{WT}/\tau_{LT} \geq 1.05$$

In other words, the formed core sheet 33 can be torqued or flexed about an axis parallel to direction W considerably easily than in the perpendicular direction about an axis parallel to direction L due to the ridge and depression orientation and positioning. It should be appreciated that the core sheet thickness will vary after it is embossed. This asymmetrical core formation is very different than the symmetry desired in various prior constructions.

Figure 6:
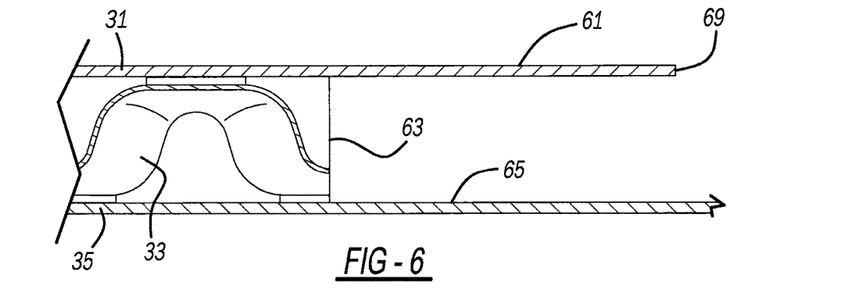
FIG. 6 is a cross-sectional view, similar to FIG. 4 but with a channel removed, showing the present system.
Figure 7:
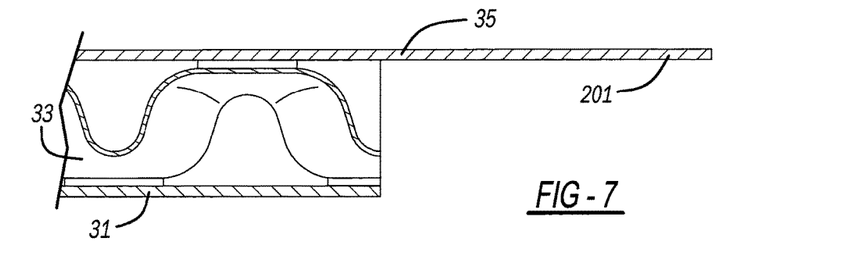
FIG. 7 is a cross-sectional view, taken within circle 7 of FIG. 3, showing the present system.
Figures 8, 9:
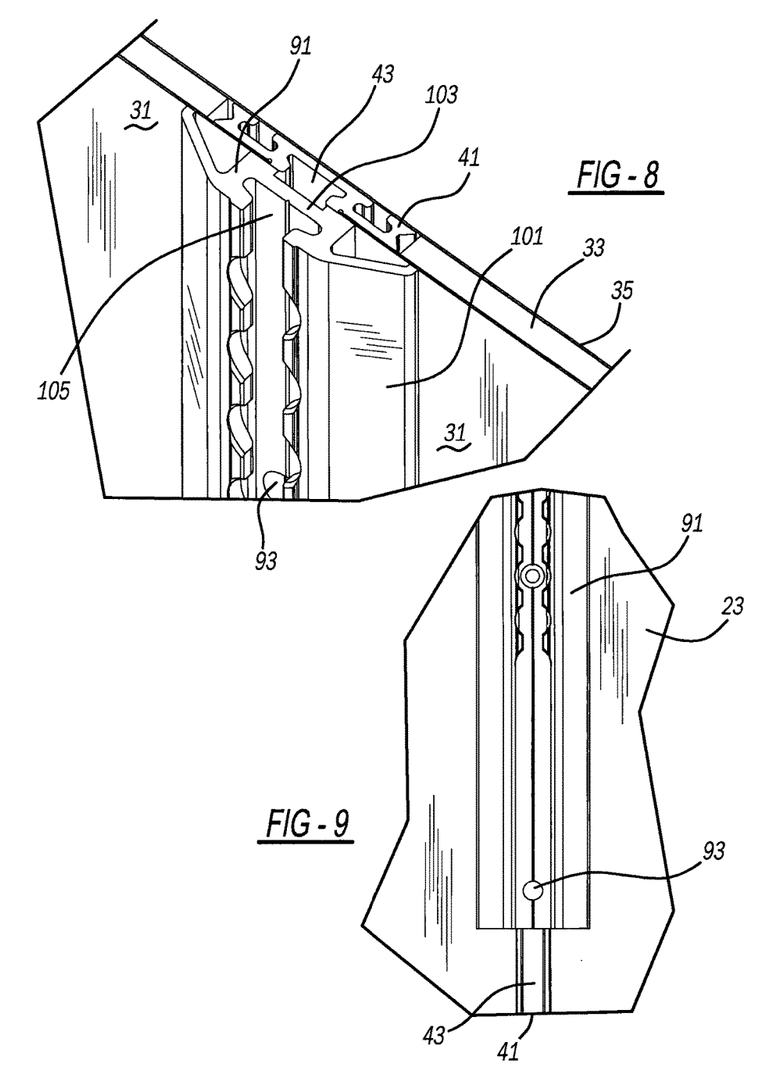
FIG. 8 is a perspective view, taken within circle 8 of FIG. 2, showing the present system.
FIG. 9 is a side elevational view, taken within circle 9 of FIG. 2, showing the present system.
Figure 10:
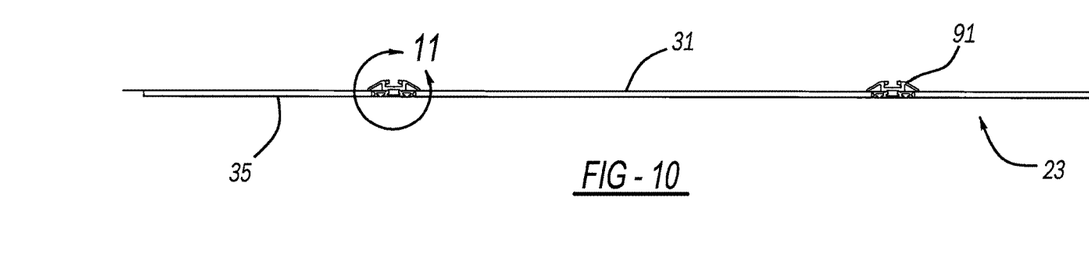
FIG. 10 is a top elevational view showing the present system.
Figure 11:
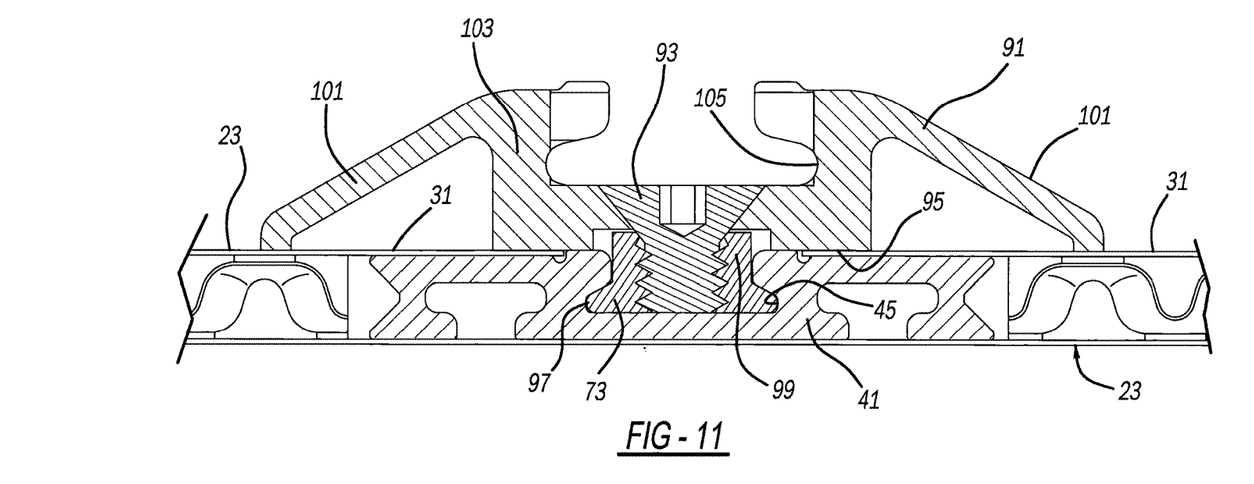
FIG. 11 is a cross-sectional view, taken within circle 11 of FIG. 10, showing the present system.
Figure 12:
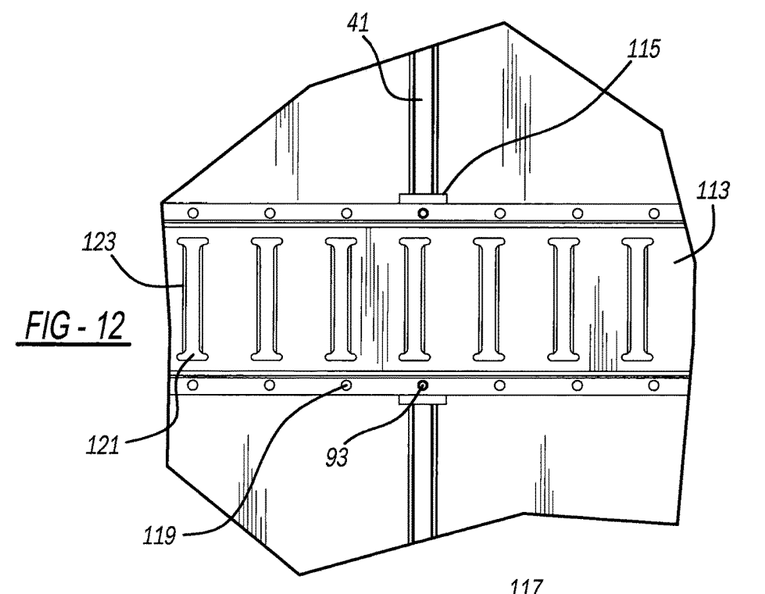
FIG. 12 is a side elevational view showing another embodiment of the present system.
Figure 13:
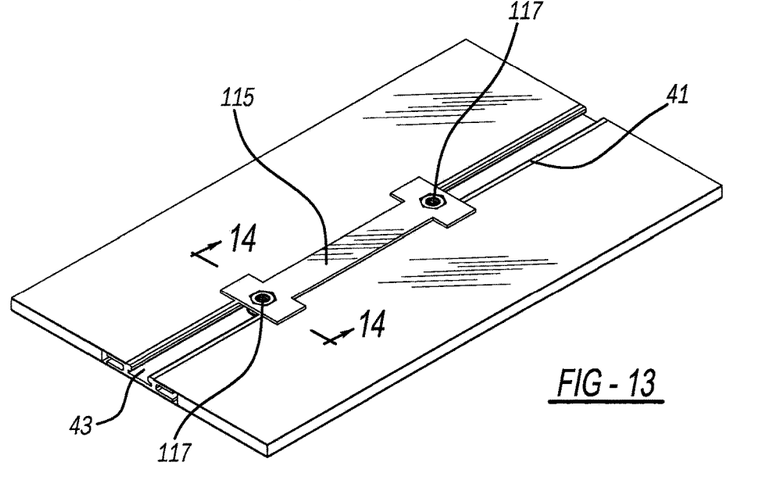
FIG. 13 is a perspective view showing the FIG. 12 embodiment of the present system.
Figure 14:
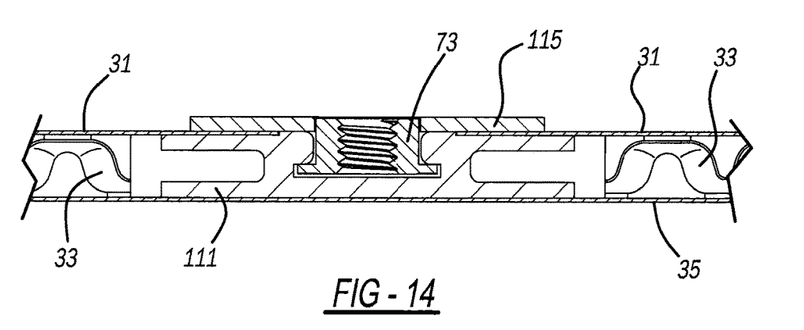
FIG. 14 is a cross-sectional view, taken along line 14-14 of FIG. 13, showing the FIG. 12 embodiment of the present system.
Figure 15:
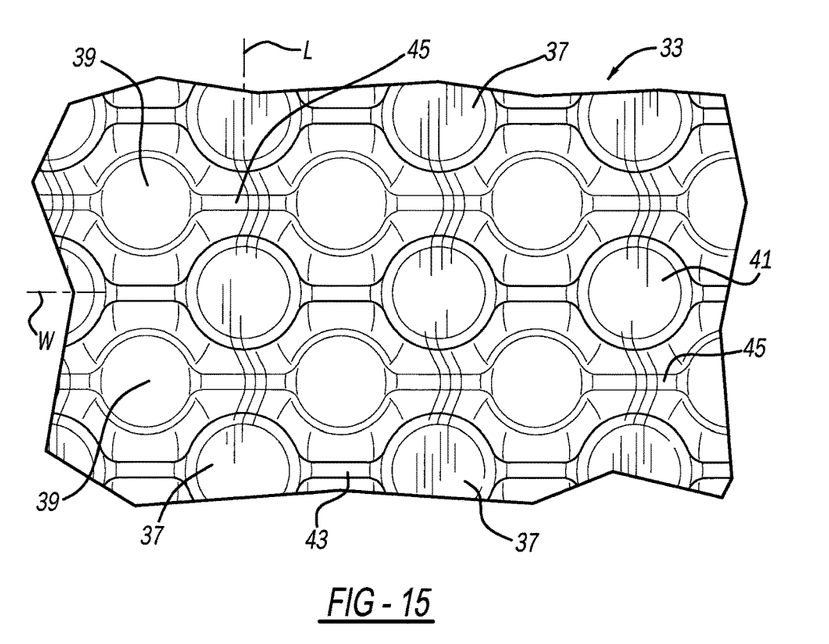
FIG. 15 is a fragmentary and enlarged true elevational view of a core employed in the present system.
Figure 16:
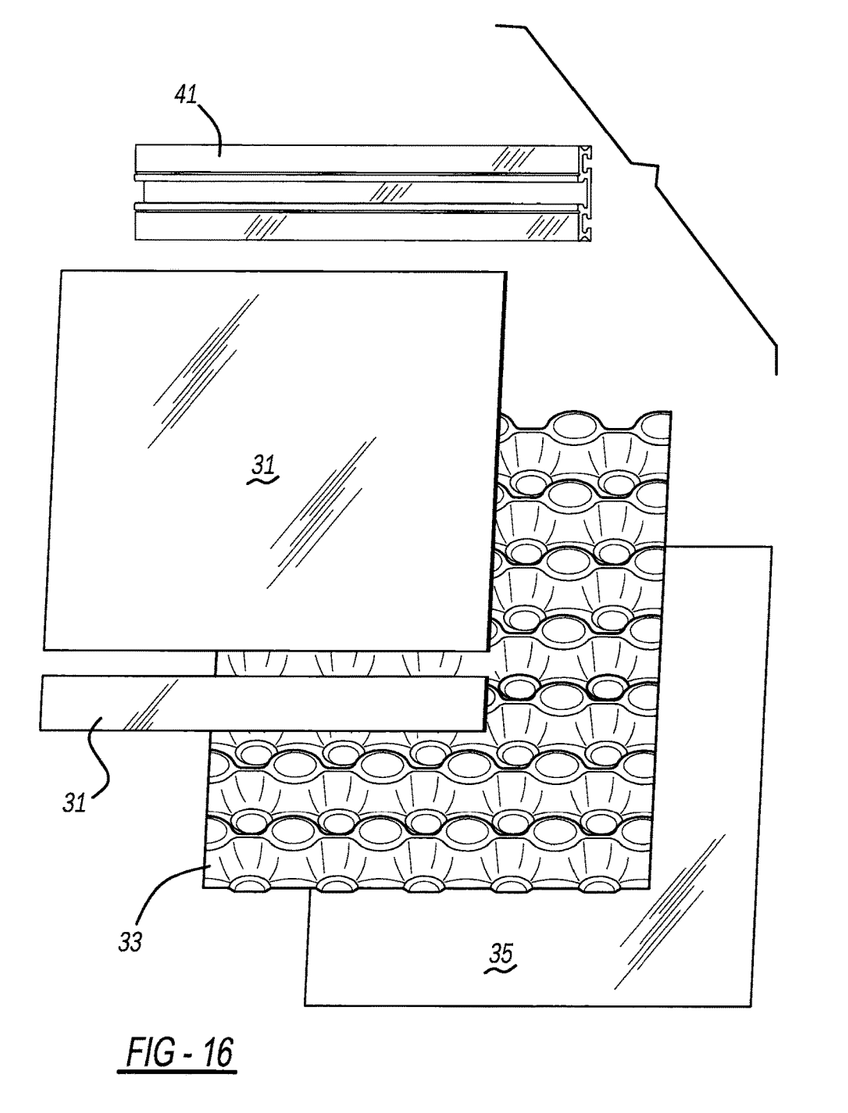
FIG. 16 is an exploded perspective view showing the FIG. 4 embodiment of the present system.

The compressive strength of the present sandwich panel 23 is maximized where the outer sheets are bonded to the core sheet, across the cross-sectional thickness (as viewed in FIGS. 6 and 7). The relative density of this particular sandwich core layer can be calculated as followed:

$$\rho^* = \frac{f_S \cdot t_C}{C}$$

where $t_c$ is the initial sheet thickness of the core layer, C denotes the core layer height and $f_s$ is the shrinkage factor in the length direction L. Thus, the asymmetrical nature of the periodic array of peak and valley cells or dimples, as connected in one direction by raised ridges and separated in the other by steep depressed areas, advantageously provides for different directional forming and final product properties and characteristics. It is preferred that the open space between the sheets, including versions with multiple core sheets, not define a honeycomb pattern, since such a pattern exhibits differing performance and manufacturing characteristics. Adhesive is the sole fastener between the lands 37 of core sheet 33 and the adjacent inner surfaces of sheets 31 and 35 in the presently preferred construction, although brazing may be alternately employed.

Reference should now be made to FIGS. 2-5. Elongated channel 41 includes a central and elongated, substantially T-cross sectionally shaped slot 43 including undercut sections 45 thereof. Channel 41 also includes laterally extending segments 47 on either side of slot 43 which each have a hollow and generally T-cross sectionally shaped area 49 therein which is open toward exterior face sheet 35. Lateral edges of each segment 47 have a depression 51 therein. Hollow areas 49 and depressions 51 reduce weight and material costs of channel 41 while allowing the channel to have the same thickness as the adjacent bordering core sheets 33. Furthermore, at least one groove or recess 53 is disposed along each generally flat interiorly facing surface of channel 41 to receive adhesive which bonds these otherwise flat surfaces of channel 41 to inner surfaces 55 and 57 of interior and exterior face sheets 31 and 35, respectively.

Channel 41 is preferably extruded from aluminum 6061 T6 material, but may alternately be steel or a reinforced polymeric or composite material. Channel 41 and its slot 43 continuously extend at least a majority, and preferably the entire distance between opposite peripheral edges of the associated sandwich panel made from face sheets 31 and 35. A flange 61 of each interior face sheet 31 extends beyond an internal peripheral edge 63 of core sheet 33. Moreover, an open intermediate portion 65 of exterior face sheet 35 projects past peripheral edge 63 of core sheet 33. A second core sheet 33 is also positioned upon the same exterior face sheet 35 with a mirrored image interior face sheet 31 secured thereupon but with a gap 67 between parallel distal edges 69 facing each other from flanges 61.

Figure 4:
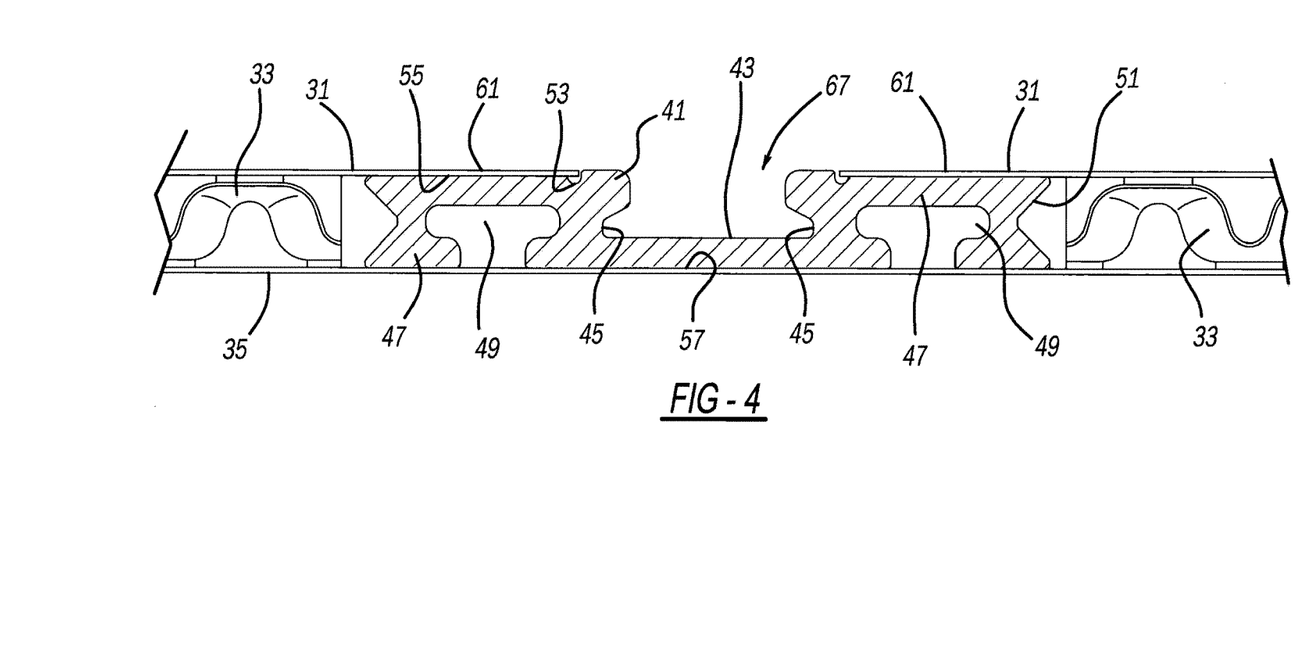
FIG. 4 is a cross-sectional view, taken within circle 4 of FIG. 3, showing the present system.

When channel 41 is inserted within the sandwich panel, as shown in FIG. 4, flanges 61 overlap and generally hide the lateral segments 47 of channel 41. This allows for sufficient mating surface area therebetween to adhesively bond channel 41 to both the inner surfaces of the two adjacent face sheets 31 and 35 without the need for hole piercing and fasteners such as rivets or screws. In this condition, channel 41 is generally flush or below flush of an interior plane defined by the innermost surface of interior face sheets 31.

Figure 5:
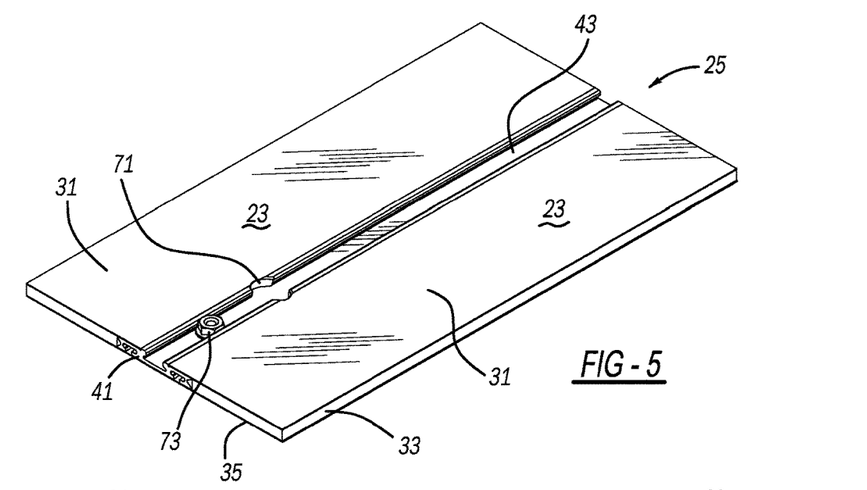
FIG. 5 is a perspective view showing the present system.

As can be observed in FIG. 5, a pair of oversized holes 71 are located in outer locations along slot 43. This allows an internally threaded nut fastener 73 to either be inserted through oversized openings 71 (especially in an aftermarket situation) or in an open end of slot 43 if accessible. Thereafter, nut 73 may be adjustably slid to infinite positions between the ends of channel 41.

As can be seen in FIGS. 2 and 8-11, a cargo-contacting or retaining track member 91 is removeably secured to nut 73 by way of an externally threaded, flat head screw fastener 93. Tightening of screw fastener 93 to nut 73 will cause a backside 95 of track 91 to bottom out against interior face sheets 31 and exposed surfaces of channel 41 due to a slight space between the facing surfaces of nut 73 and track 91. Nut 73 further includes a laterally enlarged flange 97 projecting from a body 99. This flange engages within undercut 45 of slot 43 to allow nut adjustment therein prior to being cinched down by screw fastener 93.

This type of track 91 includes oppositely tapering wings 101 extending from a main structure 103 including a continuously elongated pathway 105 therealong. Shoring beams, supplemental decks, divider boards, straps and cargo nets may be removeably attached within the pathway 105 of track 91 via locking lugs, hooks or bolt heads. Track 91 can be vertically mounted to the vertically elongated channel 41 when the panel is a container side wall, or track 91 may be horizontally mounted between multiple channels 41.

FIGS. 2 and 12-14 illustrate another embodiment employing an alternately configured channel 111 and a differently styled logistics track 113. Channel 111 has a generally H-cross sectional shape but is otherwise essentially the same as in the prior embodiment. A metallic spacer 115 is positioned between interior face sheets 31 and the backside of track 113 and has multiple hexagonally shaped openings 117 to engage and deter rotation of nut 73 disposed therein. Spacer 115 also serves to space apart two or more nuts 117 a predetermined distance away from each other during their adjustment along slot 43 of channel 41 to correspond to the required distance for holes 119 and screw fasteners 93 needed to secure track 113 to nut 73.

This track configuration employs multiple central apertures 121 of a generally I-true view shape, with bent over central tabs 123 to receive cargo strap hooks, lugs or the like. Track 113 is preferably horizontally mounted to extend in a fore-and-aft manner along sidewall panels or floor panels of the cargo carrier. Moreover, this configuration of spacer 115 preferable general has an I-true view shape as can be observed in FIG. 13.

Figures 17, 18:
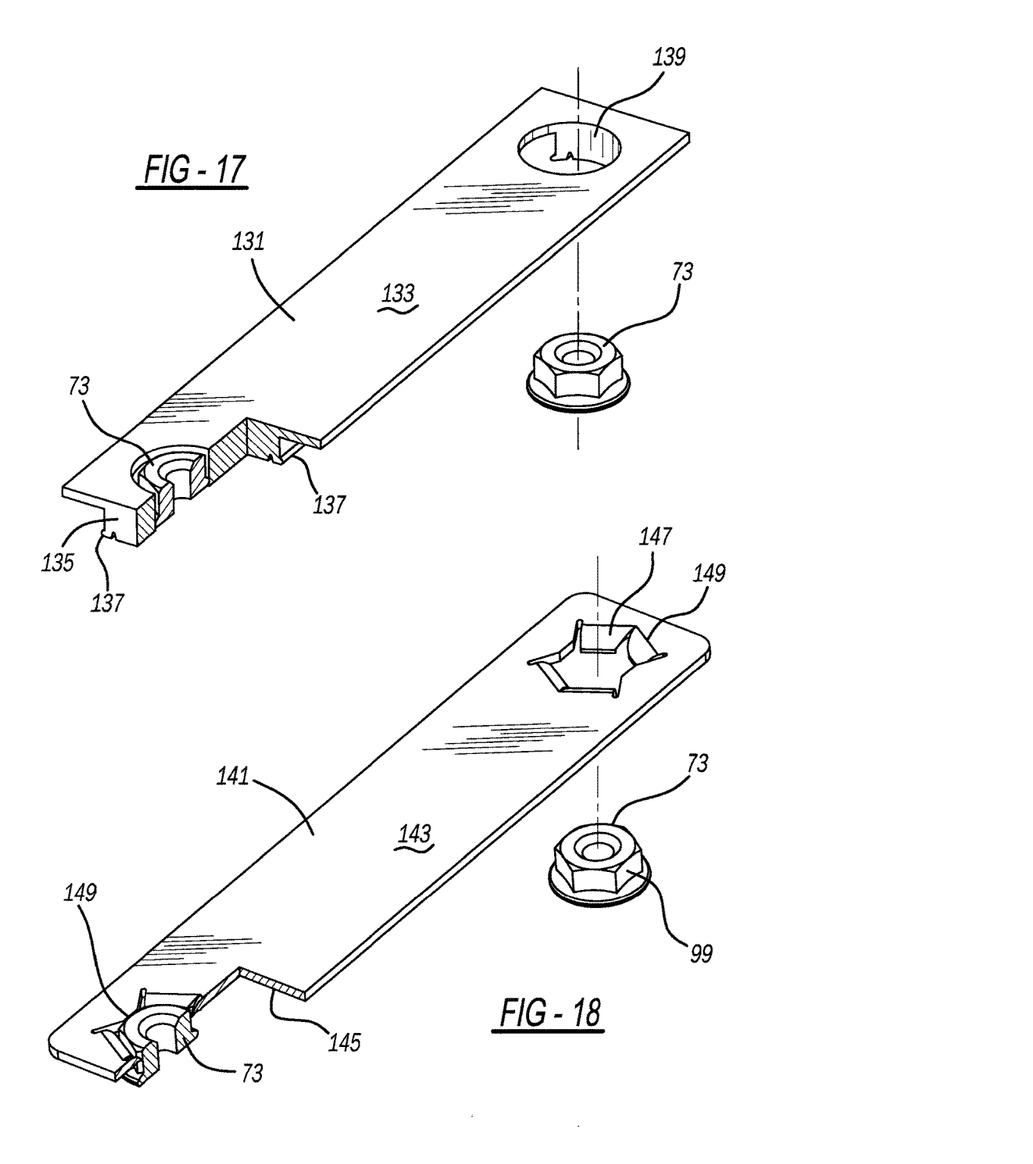
FIG. 17 is a partially exploded and fragmentary perspective view showing an alternate embodiment spacer employed in the present system.
FIG. 18 is a partially exploded and fragmentary perspective view showing another alternate embodiment spacer employed in the present system.

An alternate spacer 131 is illustrated in FIG. 17. This employs an extruded metallic part having a generally flat interior facing surface 133 with an elongated central foot 135 projecting therefrom in a generally perpendicular manner. Foot includes laterally extending flanges 137 which snap-fit engage with the undercut of the channel slot for positional retention while adjustably moving therealong. Circular holes 139 are spaced apart in spacer 131 to receive the bodies of nuts 73. Optionally, adhesive may adhere the nuts to the holes to deter rotation thereof during fastening.

Yet another embodiment of a spacer 141 is shown in FIG. 18. This spacer 141 is a stamped sheet metal part with predominantly flat upper and lower surfaces 143 and 145, respectively. However, stamped and bent fingers 147 inwardly extend from generally polygonal shaped holes 149 which serve to contact against and prevent rotation of a matching generally polygonal body 99 of the nuts 73 received therein. The fingers may optionally apply a gentle spring force against the channel to temporarily maintain a desired nut position during track installation.

Figure 19:
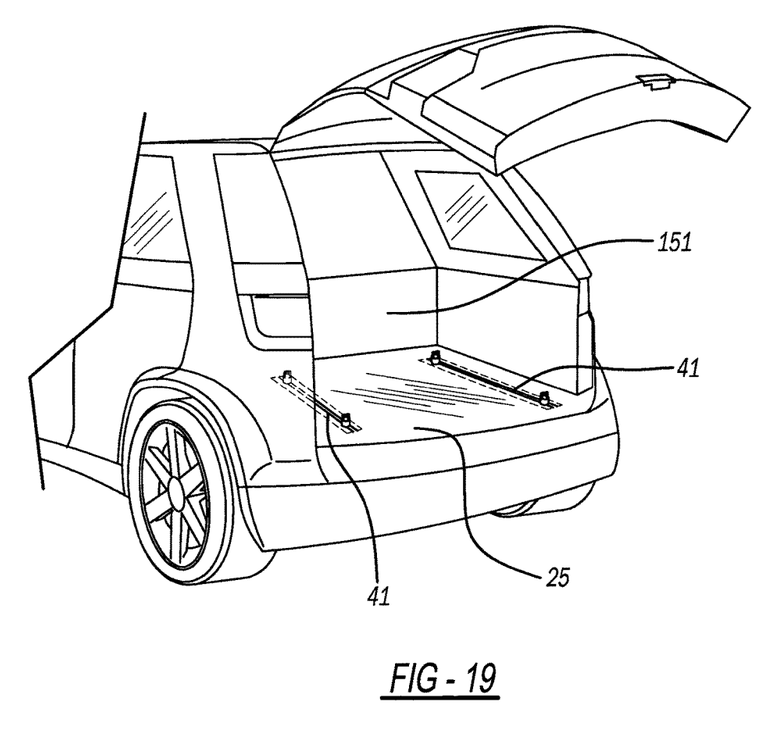
FIG. 19 is a fragmentary perspective view showing the present system in a passenger vehicle.

FIG. 19 shows the present tracks 41 and fasteners employed in a sport utility vehicle, a station wagon or other such passenger carrying wheeled, automotive vehicle. Sandwich panel 25, including the face sheets and core sheet, to which the tracks 41 are inserted. It serves as a cargo-carrying floor behind a rear passenger seat 151.

It is alternately envisioned that a lock nut, leaf spring or other biasing member may be located between the nut and an adjacent surface of the slot. This would serve to temporarily maintain a desired location of a nut fastener when a track is being attached thereto. This biasing member may also be adapted to deter rotation of the nut within the slot. Furthermore, it is envisioned that a custom designed nut fastener, such as one stamped from sheet steel, has a rectangular or other shape with opposed flats, employed within the slot to deter rotation while allowing linear sliding adjustment.

The manufacturing process will now be discussed. The channel is preferably extruded from metallic material. Thereafter, it is cut to the desired lengths. Masking tape is then applied on top of the slot such that adhesive is then roll coated onto the exterior surface of the channel. Alternately, a mask can be avoided if adhesive beads, swirls or the like are applied by robotically moving a nozzle relative to a stationary channel or moving the channel past a fixed nozzle. Next, the exterior flat surface of the channel is placed against an epoxy coated inside surface of the exterior face sheet, optionally using a locating jig. Multiple channels are so attached to each exterior face sheet.

Adhesive coats the exterior facing lands of the previously embossed core sheet and/or inner surface of the exterior face sheet, which are then compressed together between the channels. The channels are elongated generally parallel to each other in this condition and alternate between pairs of the core layers in a slightly laterally spaced apart manner. The interior face sheets are then adhered on top of the cores and segments of the channels without rivets or screw fasteners.

A peripheral flange 201 (see FIGS. 3 and 7) of exterior face sheet 35 projects beyond the peripheral edges of core sheet 33 and the outermost interior face sheet 31. At the trailer assembly facility, this flange 201 overlaps and is adhesively bonded to an adjacent sandwich panel, without hole piercing, riveting or use of other fasteners. Thus, the channels and sandwich panel are manufactured and assembled together in a modularized manner at a first manufacturing plant location prior to shipment to the trailer assembly source, and prior to adjustment and/or installation of the cargo-contacting tracks and slats by the dealer or end use customer.

The present apparatus is ideally suited for a modularized wall, roof or floor construction in the container since channels 24 can optionally be preassembled to sandwich panels 23 which allows for preassembled strength versus weight optimized tailoring and fast final assembly with minimal extra parts. The present apparatus can also be used in combination with one or more of the features of commonly owned PCT Patent Publication No. WO 2015/148707, entitled "Container Apparatus Including Sandwich Structure," and incorporated by reference herein. Moreover, it is expected that the assembled screw fastener, nut, channel and panel pull-out force (perpendicular to the interior face sheet plane) will be at least 800 pounds per fastener (e.g., using a standard flanged nut ¼"-20 thread).

While various embodiments of the present invention have been disclosed, it should also be appreciated that other variations may be employed. For example, other dimensions and shapes may be provided for the core sheet and channels, however, many of the manufacturing advantages and property strengths will not be achieved. It is alternately envisioned that the core may be foam with or without an intermediate metallic sheet, although some of the preferred advantages may not be realized, such as recyclability. It should also be appreciated that any of the preceding embodiments and features thereof can be mixed and matched with any of the others depending upon the final product and processing characteristics desired. Variations are not to be regarded as a departure from the present disclosure, and all such modifications are intended to be included within the scope and spirit of the present invention.

The invention claimed is:

1. A cargo transportation system comprising:
    (a) at least one sandwich panel, defining at least part of a cargo carrying area, comprising:
        (i) at least one exterior face sheet;
        (ii) multiple interior face sheets;
        (iii) multiple cores coupling the interior face sheets to the at least one exterior face sheet; and
        (iv) a peripheral flange of each of the interior face sheets terminating at an edge, the edges facing each other, being substantially parallel to each other and extending beyond adjacent peripheries of the cores; and
    (b) an elongated channel comprising:
        (i) an elongated undercut slot bordered by lateral extension segments;
        (ii) the extension segments being located between and secured to: inner surfaces of the flanges of the adjacent and substantially co-planar interior face sheets, and an inner surface of the at least one exterior face sheet, such that the flanges overlap the lateral segments of the channel; and
        (iii) the slot being openly exposed through a gap defined by the edges of the adjacent flanges.

2. The system of claim 1, wherein each of the cores includes a metallic sheet comprising alternating peaks and valleys, each of the cores extends a majority of length and width dimensions of the face sheets, and the channel is laterally spaced away from the adjacent cores between which the channel is located.

3. The system of claim 2, wherein:
    the core further comprises raised ridges spanning between adjacent pairs of the peaks;
    the face sheets are all metallic;
    the core is adhesively bonded to the face sheets; and
    the channel is adhesively bonded directly to the inner surface of at least one of the face sheets.

4. The system of claim 1, further comprising a fastener having a laterally expanded flange engaging within the undercut slot of the channel, the fastener being slideable to infinite positions along the channel, the slot continuously extending at least a majority distance of the panel to which it is attached.

5. The system of claim 4, wherein the fastener is an internally threaded nut and the slot has a substantially T-cross sectional shape.

6. The system of claim 1, further comprising a cargo-carrying container including multiples of the sandwich panel and multiples of the channel, the channels being vertically elongated and parallel to each other, and threaded fasteners being adjustably slideable along the channels and being accessible through the gap.

7. The system of claim 6, further comprising:
    cargo contacting members including at least one of: logistics tracks and tie-down slats;
    the container being a wheeled trailer; and
    the sandwich panels of the trailer and the members being fastenable to the channels without rivets and without piercing the face sheets of the sandwich panels.

8. The system of claim 1, further comprising:
    a logistics track including a central opening and an elongated, substantially rectangular periphery; and
    an externally threaded fastener operably engaging with an internally threaded nut adjustably coupled to the slot to secure the logistics track to the channel and, thus, the at least one sandwich panel, without rivets and without fastener holes in the sandwich panel; and
    a pull-out force will be at least 800 pounds per fastener.

9. The system of claim 1, wherein the at least one sandwich panel is a cargo-carrying floor of a passenger-carrying sport utility vehicle or station wagon vehicle.

10. The system of claim 1, further comprising:
    multiple threaded fasteners slideable within the slot of the channel; and
    a spacer coupling together the fasteners to position them a predetermined spaced location away from each other as they are adjustably moved along the slot.

11. The system of claim 1, further comprising:
    a threaded fastener; and
    a metallic coupler coupling to the fastener to deter its rotation, and the coupler being slidably coupled to the slot of the channel.

12. The system of claim 1, wherein the lateral segments of the channel have hollow areas open to the exterior face sheet, and the channel is a single piece of extruded metal with an open end.

13. The system of claim 1, wherein the cores are foam and the channel is located between adjacent of the cores.

14. A cargo transportation system comprising:
(a) multiple adjacent floor or sidewall panels defining at least part of a cargo-carrying area, each of the panels comprising:
  (i) an interior face sheet; and
  (ii) an exterior face sheet, the face sheets being coupled together but spaced apart from each other, and the face sheets being of the same material;
(b) a single piece and elongated channel entirely located between parallel planes defined by outer surfaces of the face sheets; and
(c) a peripheral flange of the interior face sheet overlapping with and hiding a segment of the channel but exposing an elongated slot of the channel to the cargo-carrying area.

15. The system of claim 14, further comprising a core located between the face sheets, the core comprising a metallic sheet including alternating peaks and valleys, the channel being laterally adjacent to a periphery of the core.

16. The system of claim 15, wherein:
the core further comprises raised ridges spanning between adjacent pairs of the peaks;
the face sheets are all metallic;
the core is adhesively bonded to the face sheets; and
the channel is adhesively bonded directly to the inner surface of at least one of the face sheets.

17. The system of claim 14, further comprising a fastener having a laterally expanded flange engaging within a slot which includes an undercut, the fastener being slideable to infinite positions along the slot which continuously extends at least at majority distance of the panel to which it is attached.

18. The system of claim 17, wherein the fastener is an internally threaded nut or externally threaded stud, the nut or stud has a laterally expanded flange or head which engages the slot which has a substantially T-cross sectional shape.

19. The system of claim 14, further comprising:
a logistics track including a central opening and an elongated, substantially rectangular periphery; and
an externally threaded fastener operably engaging with an internally threaded nut adjustably coupled to the slot to secure the logistics track to the channel and, thus, the sandwich panel, without rivets and without fastener holes in the sandwich panel.

20. The system of claim 14, further comprising a second interior face sheet including a peripheral flange overlapping with and hiding a segment of the channel on the opposite side of the slot from the other interior face sheet, and the panels are part of a cargo-carrying container.

21. The system of claim 14, further comprising multiple elongated logistic tracks or tie-down slats adjustably fastenable to the channel without rivets and without piercing the panels, and multiples of the channel being secured to a single one of the panels.

22. The system of claim 14, further comprising:
multiple threaded fasteners slideable within the slot of the channel; and
a spacer coupling together the fasteners to position them a predetermined spaced location away from each other as they are adjustably moved along the slot.

23. The system of claim 14, wherein the channel includes an over-sized access hole in communication with the slot, the slot continuously extends at least a majority distance of the associated panel, further comprising a fastener adapted to enter the access hole during installation before being slid along the slot.

24. A cargo transportation system comprising:
(a) a sandwich panel, defining at least part of a cargo carrying area, comprising:
  (i) a metallic exterior face sheet;
  (ii) a metallic interior face sheet;
  (iii) a metallic core coupling the interior face sheet to the exterior face sheet;
  (iv) a peripheral flange of the interior face sheet terminating at a first outermost peripheral edge which extends beyond first outer peripheries of the adjacent portions of both the exterior face sheet and the core; and
  (v) a peripheral flange of the exterior face sheet terminating at a second outermost peripheral edge, opposite the first edge, which extends beyond second outer peripheries of the adjacent portions of both the interior face sheet and the core;
(b) an elongated insert comprising a substantially T-cross sectionally shaped slot laterally bordered by a securing segment,
  (i) the insert being located within a cavity of the sandwich panel such that a solid and unperforated bottom wall of the insert is solely attached against one of the face sheets by adhesive;
  (ii) the cavity being inwardly spaced in a middle area between the first and second outermost opposite peripheral edges of the sandwich panel;
  (iii) the core having an elongated gap at the cavity such that the core is not between the insert and the exterior face sheet; and
  (iv) the slot continuously extending at least a majority of a linear dimension of the core;
(c) a threaded nut or stud being adjustably moveable along the slot; and
(d) an elongated cargo-contacting or retaining member being removeably fastenable to the nut or stud.

25. The system of claim 24, wherein the member further comprises a fore-and-aft elongated logistics track being elongated substantially perpendicular to a direction of elongation of the insert, and an externally threaded fastener operably engages with the nut to secure the logistics track to the insert which is a metallic channel and, thus, the sandwich panel, without rivets.

26. The system of claim 24, wherein the core comprises alternating peaks and valleys, the core extending a majority of length and width dimensions of the face sheets, the securing segment of the insert further comprises a pair of parallel extension walls laterally extending outwardly from each side wall within which is the slot, and the extension walls laterally extend parallel to nominal sections of the face sheets.

27. The system of claim 24, wherein:
the lateral securing segment of the insert has a hollow area;
a thickness of the bottom wall of the insert is no greater than a thickness of each inwardly extending undercut segment on either side of the slot; and
the insert is a single piece of extruded metal with an open end.

28. The system of claim 24, wherein:
the panel is part of a wheeled trailer;
further comprising a second sandwich panel, the panels having the same construction and being attached to each other without rivets and without pierced holes such that the extending first outermost peripheral edge of the interior face sheet of one of the sandwich panels overlaps with and is adhesively bonded to the other of the sandwich panels adjacent its second outermost peripheral edge; and the extending second outermost peripheral edge of the exterior face sheet of the other of the sandwich panels overlaps with and is adhesively bonded to the one of the sandwich panels.

29. The system of claim 24, wherein the panel is a floor of a passenger vehicle, and insert is substantially flush or below flush of the interior face sheet.

30. A method of manufacturing a cargo transportation system, the method comprising:
   (a) attaching face sheets of a sandwich to a core sheet of the sandwich in a first manufacturing plant;
   (b) securing an elongated channel, including an undercut shaped and continuously elongated slot, to the face sheets at a location without the core between the channel and an exterior of the face sheets, in a rivet-free manner;
   (c) shipping the pre-assembled sandwich and channel as a module to a separate wheeled box trailer assembly location.

31. The method of claim 30, further comprising adhesively bonding the channel between the interior face sheet and an exterior face sheet of the panel in a rivet-free manner.

32. The method of claim 30, further comprising extruding the channel from a metallic material with a thickness of a bottom wall of the channel being no greater than a thickness of each inwardly extending segment on either side of the undercut slot.

33. The method of claim 30, further comprising:
   using rollers to emboss the core sheet of the sandwich to form alternating peaks and valleys from a sheet of metal;
   positioning the channel laterally adjacent an inner periphery of the core sheet which is laterally shorter than a section of at least one of the face sheets which overlaps the channel; and
   adhesively bonding laterally extending walls, projecting outwardly from each side wall between which are the slot, of the channel to the section of the adjacent face sheet which is parallel to the laterally extending walls.

34. The method of claim 30, further comprising:
   sliding a fastener comprising a nut or stud, within the slot of the channel; and
   removeably securing an elongated logistics track or tie-down slat to the moveable fastener.

35. The method of claim 30, further comprising:
   adhesively bonding a peripheral lip of one of the face sheets, extending past peripheral edges of the core and the opposite of the face sheets, to an adjacent sandwich panel without rivets or threaded fasteners; and
   vertically adjustably moving and then horizontally spanning a removeable logistics track in a fore-and-after direction between multiples of the channel in each of the adjacent sandwich panels along a wheeled box trailer wall.

36. The method of claim 30, further comprising:
   the channel including a substantially T-cross sectional shape; and
   allowing a threaded fastener including an enlarged flange to slide within the channel, the fastener being configured to removeably secure a logistics track to the channel.

37. The method of claim 30, further comprising:
   causing the core sheet to have a different metallic grain structure in a first direction versus a second and perpendicular direction; and
   causing the core sheet to be more flexible in the first direction than in the second direction.

38. The method of claim 30, further comprising:
   cutting the channel, which is extruded metal, to a desired length; and
   adhesively attaching multiples of the channel to an interior one of the face sheets, all of the sheets being metallic.

39. The system of claim 24, wherein there are multiples of the insert attached to the sandwich panel in a spaced apart, parallel and vertically extending manner.

40. The system of claim 39, wherein the member is a horizontally elongated logistics track including multiple spaced apart and vertically elongated apertures, and the logistics track is removably secured to the inserts with the assistance of multiples of the nut or the stud.

41. The system of claim 24, wherein:
   the core of the sandwich panel further comprises raised ridges spanning between adjacent pairs of spaced apart peaks in one direction but not in a perpendicular direction, the ridges being lower than lands of the peaks;
   a metal grain structure of the core being different in a first direction than in a second direction perpendicular thereto; and
   the core being more flexible in the first direction than in the second direction.

42. The system of claim 24, wherein the insert further comprises an oversized hole located in the slot to allow the nut or the stud to be removably inserted into the slot.

43. The system of claim 24, wherein the member is a vertically elongated logistics track including a continuously elongated pathway with inwardly facing lips which define an elongated opening therebetween, and the logistics track is removeably secured to the insert with the assistance of the nut or the stud.

* * * * *